EXPOSURE REGISTRATION APPARATUS

Filed June 30, 1966

INVENTOR.
ALAN F. SCHOENTHAL
BY Anthony D. Cennamo
Paul W. Fish
ATTORNEYS

United States Patent Office 3,473,455

Patented Oct. 21, 1969

3,473,455
EXPOSURE REGISTRATION APPARATUS

Alan F. Schoenthal, Rochester, N.Y., assignor to Xerox Corporation, Rochester, N.Y., a corporation of New York Filed June 30, 1966, Ser. No. 561,892
Int. Cl. G03b *29/00;* H04n *5/76*
U.S. Cl. 95—12 5 Claims

ABSTRACT OF THE DISCLOSURE

A xerographic information recording apparatus utilizing a light sensitive recording medium wherein any point within an area of this medium passing through an exposure station is represented by ramp voltage signal generated by a linear potentiometer. The period of the ramp signal is a function of the speed of the recording medium past an exposure station and the amplitude of the signal at any point in time during its period is representative of a given point within the area of the recording medium as it passes through the exposure station. Amplitude responsive circuits provide control signals for initiating full frame exposures of the recording medium in proper registration.

Figure 1:
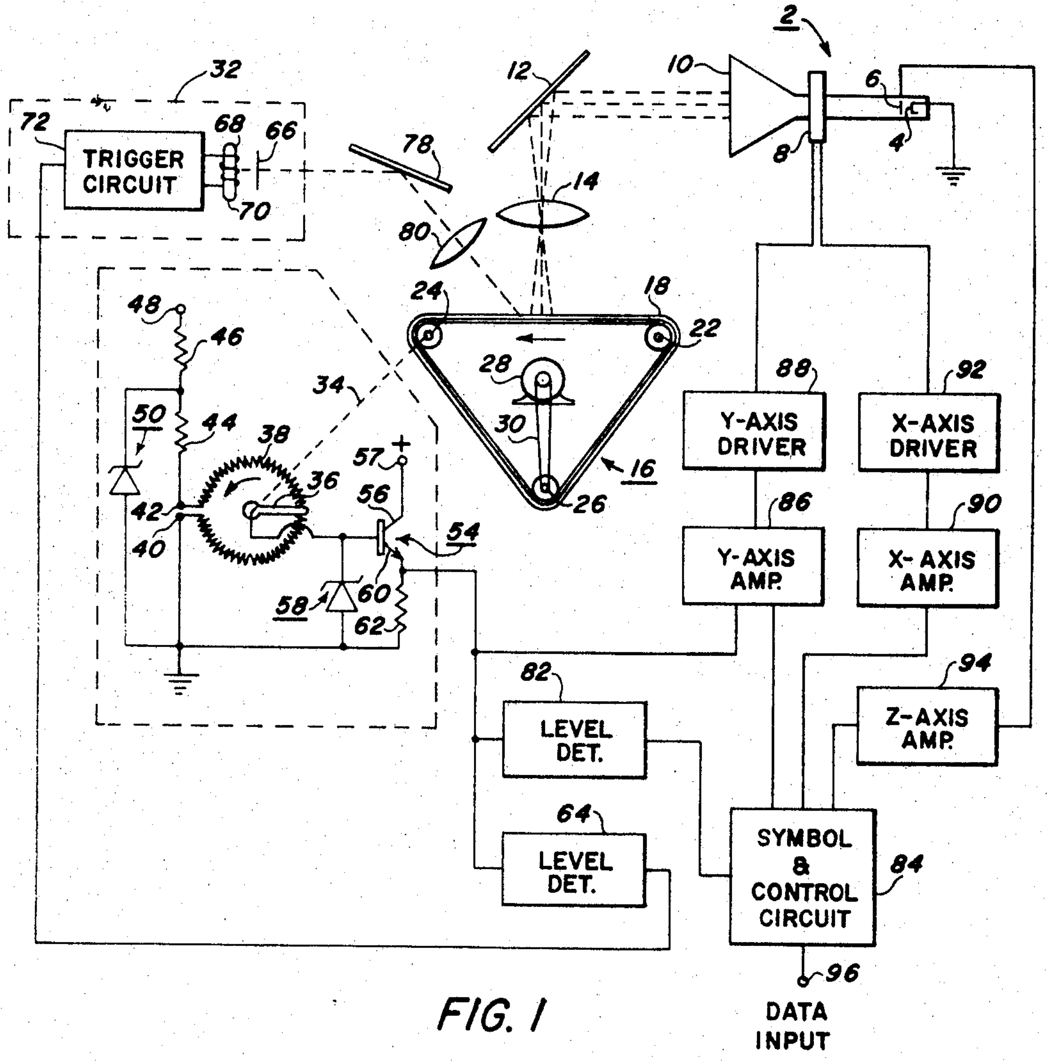

The present invention relates generally to exposure registration, and, more particularly, to full-frame exposure registration of at least two light patterns on a continuously moving light sensitive recording surface.

From the first commercial acceptance of xerography as a way to translate light patterns, either original or reflected, into permanent fused toner patterns on untreated paper, many applications of this concept have been developed. The reusability of the light sensitive recording surface, such as selenium, and the advantages of permanent copies on untreated paper have been most attractive in designing various data read-out applications for xerography.

One example of this attraction is a computer read-out apparatus wherein a computer may supply billing data such as a customer's name, address, account number, items billed to him, and date of billing, etc. It is very desirable to use this information accumulated and stored by the computer directly to generate the necessary account statements ready for mailing. In order to make this possible, a read-out device interfaced with the computer's output is necessary.

Such a device may take the form of a cathode ray tube which is capable of generating characters on its fluorescent screen in response to computer data. These characters are then focused onto a continuously moving pre-charged photoconductive belt thereby forming corresponding latent electrostatic character patterns thereon. The character patterns can then be developed according to known xerographic developing techniques resulting in a permanent copy of the computer data on sheets of untreated paper.

If it were desired to generate account statements for customer mailing, the paper sheets could be replaced with standard account statement forms and these forms fed into the read-out apparatus to accept the transferred developed character patterns from the photoconductive surface. It is well known that the billing information can be formatted on the face of the cathode ray tube (CRT) to correctly correspond to the layout of the particular account statement form used.

However, certain disadvantages exist in the above read-out device. One undesirability is the commitment to a standard form and the need to have a large forms inventory available for the read-out device. The expense of pre-printed forms is also undesirable. From a technical aspect, exact registration of the developed character pattern on the photoconductor and the form sheet is difficult to achieve consistently. Also, automatic alphabetical read-out of customer account information, for example, from the computer makes recycling of that particular customer data impractical in the case of misregistration.

All of the aforementioned disadvantages can be avoided when a read-out device utilizes full-frame projection of the computer data as well as the business form. This device is similar to the aforedescribed device but with the very important difference of forms projection.

In this way, one of many forms, stored on microfilm, for example, can be projected onto the photoconductor along with the formatted billing data. This eliminates the costly pre-printed billing forms and allows simple and convenient selection of any desired form, such as account statement, overdue bill notice, correction, etc.

The only problem to surmount with this device is exposure registration on the photoconductor of the form projection and the formatted character pattern from the CRT. It is imperative that a reliable and inexpensive way be utilized in accomplishing this exposure registration.

Therefore, it is an object of the present invention to provide exposure registration of at least two light patterns on a light sensitive recording medium.

Another object of the present invention is to initiate the projection of at least two informational light patterns to permit exposure registration thereof on a light sensitive member.

An additional object of the present invention is to superimpose at least two light patterns on a moving light sensitive member.

A further object of the present invention is to provide full-frame exposure on a moving photoconductive surface with electronic circuitry compensating for the movement of the surface during exposure.

A still further object of the present invention is to superimpose a fixed format exposure on a dynamic cathode ray tube display and to obtain correlation between the exposure and the display.

These and other objects are accomplished in accordance with the principles of the present invention wherein any point within an area of a light sensitive recording medium passing through an exposure station is represented by a ramp voltage signal. The period of the ramp signal is a function of the speed of the recording medium past an exposure station and the amplitude of the signal at any point in time during its period is representative of a given point within the area of the recording medium as it passes through the exposure station.

Figure 2:
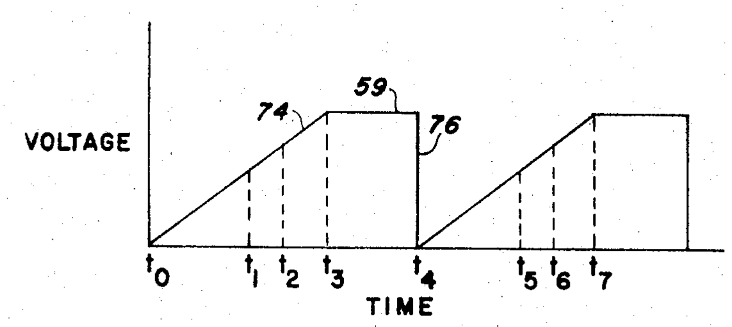

For a better understanding of the invention as well as other objects and features thereof, reference may be made to the following detailed description of the invention to be read in connection with the accompanying drawing, wherein:

FIG. 1 illustrates a schematic diagram of a preferred embodiment of the read-out apparatus in accordance with the present invention; and, FIG. 2 illustrates waveforms helpful in understanding the operation of the apparatus of FIG. 1.

Reference will now be made to FIGS. 1 and 2. In FIG. 1 a conventional cathode ray tube is shown as generally designated by reference numeral 2. For simplicity of illustration, the necessary acceleration and focusing electrodes have been omitted. However, CRT 2 is shown to have a grounded cathode 4 and an intensity control electrode 6 as well as an electromagnetic deflection yoke 8. It is understood, of course, that the yoke may be replaced by a conventional set of electrostatic deflection plates if so desired.

The light emitted from the fluorescent screen (not numbered) on the face plate 10 of the CRT 2 is optically projected via a mirror 12 and a lens assembly 14 onto the surface of a flexible xerographic plate which, in a preferred embodiment, is in the form of a continuous belt 16. This belt 16 may comprise an outer layer of photoconductive material 18 overlying a backing layer of conductive material 20 which is normally connected to a reference voltage, such as ground.

This continuous belt 16 is positioned around three pulleys 22, 24 and 26 which move the belt through its path of travel and are so arranged that the belt 16, in effect, becomes a three-sided or triangular xerographic plate. The roller 26 is driven at a continuous and uniform speed by a suitable motor 28 coupled thereto by a drive belt 30, for example.

As is known in prior art xerography, the photoconductive material 18 of the belt 16 is electrostatically sensitized by a conventional suitable corona discharge electrode apparatus, for example, which has been omitted from the drawing for purposes of clarity. Similarly, suitable developing apparatus, for example, a cascade-toner reversal developer, and a transfer assembly for transferring the developed charge pattern from the belt 16 to the surface of untreated paper are normally positioned at suitable points along the belt's path. Also, no illustration has been made of the fusing assembly used to fix the toner pattern adhering to the untreated paper after the transfer step.

For purposes of completeness, it should be noted that the sensitizing of the photoconductive material 18 would desirably take place prior to entry of that particular portion of the belt 16 into the exposure zone. The exposure zone can be referred to as that portion of the belt's path between rollers 22 and 24. The developing zone would then be considered that portion of the belt's path between rollers 24 and 26. At roller 26, suitable transfer of the toner image to the untreated paper may be accomplished. The portion of the belt's path between this roller 26 and roller 22 can be considered the cleaning zone and the sensitizing zone for removing any excess toner from the belt, discharging the photoconductive material completely, and applying a uniform electrostatic charge thereto prior to exposure.

It should also be understood that in accordance with one aspect of prior art xerography, the uniform electrostatic charge on the belt 16 as it enters the exposure zone is selectively discharged in correspondence with the light patterns focused thereon either from the CRT 2 or from the forms projector, generally designated by the reference numeral 32. This forms projector 32 will be explained in more detail hereinafter.

Rollers 22 and 24 are referred to as idler rollers in that they rotate only when the belt is in motion and are not directly driven as is roller 26 by the motor 28. The broken line 34 designates suitable mechanical linkage between idler roller 24 and a rotating arm or tap 36 on a circular, linear potentiometer 38. By the term linear, it is meant that as the potentiometer's arm 36 is moved from one terminal of the potentiometer toward the other terminal of the potentiometer, the resistance between the arm and the two respective terminals varies as a linear function of the position of the arm from the respective terminals.

The mechanical linkage 34 and the rotating arm 36 are of such a design as to provide for continuous and uniform rotation of the arm 36 in a counter-clockwise direction, indicated by the arrow, as the flexible belt 16 moves through its triangular path. It is understood that the rotatable arm 36 may complete several rotations for each complete transit of the belt 16 through its triangular path. One terminal 40 of the potentiometer 38, referred to as the initial terminal, is directly connected to a reference potential, such as ground. The other terminal 42 of the potentiometer 38, referred to as the end terminal, is connected through resistors 44 and 46 to a source of suitable positive potential applied at terminal 48. At the junction between these resistors 44 and 46 is connected a Zener diode 50, the cathode of which is connected to this junction while the anode is connected to ground potential. The values of the resistors 44 and 46 as well as the total resistance of the potentiometer 38 is such as to maintain the Zener diode 50 in its Zener region thereby maintaining a constant and uniform potential across resistor 44 and the potentiometer 38. As the arm 36 moves through a complete rotation between the initial and end terminals of the potentiometer 38, the voltage signal at the output from this moving arm approximates a sawtooth waveform.

Connected to this arm 36 is the base electrode 52 of a NPN transistor 54 connected in an emitter-follower configuration. This transistor 54 has its collector electrode 56 connected directly to a source of suitable positive potential applied at terminal 57 and its emitter electrode 60 connected through a load resistor 62 to ground or reference potential. In the base circuit, Zener diode 58 has its anode connected to ground and its cathode connected directly to the base electrode 52.

The Zener diode 58 functions to clip a portion of the sawtooth voltage signal generated at the rotating arm 36 before the signal is applied to the base electrode 52 of the transistor 54. This can be seen more clearly with reference to the waveform 76 in FIG. 2 wherein the clipping level imposed by the Zener diode 58 is designated by the uniform amplitude portion 59 of waveform 76. This clipping action is preferred to insure that the Y-axis amplifier 86 and the two level detectors 64 and 82 are not damaged by an excessively high voltage input signal from the load resistor 62. The amplitude of the voltage signal generated by the rotation of the arm 36 across the potentiometer 38 is desirable in order to obtain a very steep ramp portion 74 in the waveform 76 as seen in FIG. 2. The desirability of this particular shape for waveform 76 will be explained in more detail hereinafter.

The signal developed across the load resistor 62 serves as an input signal for three circuits. The first input is to a conventional signal level detector 64 which has an output connected directly to the forms projector 32. The forms projector may include a film negative 66, for example, which bears the pattern of the desired business form to be projected onto the belt 16. The source of projection illumination for the forms pattern may take the form of a gas-filled flash lamp, for example, generally designated by the reference numeral 68, and which, as shown, has a trigger coil 70 surrounding its bulb or envelope. This trigger coil 70 is connected to a conventional trigger circuit 72 which can include a simple relay circuit or a control rectifier circuit.

The function of the level detector 64 is to electrically sense or detect a particular amplitude or level along the ramp portion 74 of the sawtooth voltage signal 76 as shown in FIG. 2. Once this predetermined amplitude of the voltage signal, which corresponds to a particular position of the belt 16 in the exposure zone, is detected, a control signal is translated from the detector 64 to the trigger circuit 72 in the forms projector 32 to initiate the full-frame projection of the pattern on the film negative 66 via suitable optics, such as a mirror 78 and lens assembly 80, onto the moving surface of the flexible belt 16. It is understood that the response characteristics of the photoconductive material 18 on the belt 16 is preferably spectrally matched with the light emitted by the forms projector 32. It is noted that suitable filters may be utilized to achieve this spectral matching.

Another input which is served by the voltage signal across the load resistor 62 is to another signal level detector 82 which may be of identical design as the aforementioned signal level detector 64. This level detector senses an amplitude of the ramp portion 74 of the waveform 76 as shown in FIG. 2 and provides a control signal to the symbol and control circuit, generally designated by the reference numeral 84 in FIG. 1. This symbol and control circuit is of a conventional design and receives input data at an input terminal 96 corresponding to the information and format thereof to be displayed by the CRT 2. The input data to the symbol and control circuit 84 may be derived from a variety of information sources such as electronic computers, automatic data processors, magnetic storage units, central filing systems and telecommunication networks. The symbol and control circuit 84 may include desirable buffer storage units to store the necessary input data including format position and unblanking signals.

The symbol or character information placed in the symbol and control circuit 84 in FIG. 1 would include information and format signals. The circuit 84 would convert these signals into appropriate Y-axis and X-axis deflection signals required to generate individually the desired characters in the particular information to be displayed. The character information could be received sequentially with interspersed position signals indicating the initial position of the character or symbol or groups of symbols immediately following that particular position signal.

The output signal from the level detector 82 serves to place the symbol and control circuit 84 in a display mode of operation. That is, it effectively permits the information to be displayed as well as format information to pass from the symbol and control circuit 84 through the respective channels to the CRT 2.

The third input which is connected to the load resistor 62 in the emitter circuit of the transistor 54 is that of the Y-axis amplifier 86. This amplifier 86 may be an operational amplifier of conventional design and provides an output signal which is effectively the summation of its two input signals. The other input to this amplifier 86 is from the symbol and control circuit 84, and represents the vertical deflection necessary to generate a particular symbol or to position the electron beam for the next symbol display.

It should be noted that reference to the vertical direction is intended to mean that direction which lies in the plane of the drawing and is perpendicular to the axis of the CRT as illustrated in FIG. 1. The output of the Y-axis amplifier is directly connected to the input of a suitable and conventional driver circuit 88 which provides a driving deflection signal to the Y-axis or vertical deflection coil in the yoke 8 of the CRT 2.

In the horizontal deflection channel, an output signal from the symbol and control circuit 84 is fed to an X-axis amplifier 90 which is of similar design as Y-axis amplifier 86. This signal is then translated directly to the input of a conventional X-axis driver 92, the output of which is coupled to the horizontal or X-axis deflection coil in the yoke 8.

A third channel exists between the symbol and control circuit 84 and the intensity control electrode 6 of the CRT 2 and includes a Z-axis amplifier 94 which receives signals from the symbol and control circuit 84, to selectively unblank the normally blanked electron beam emanating from the cathode 4 in the CRT 2.

This unblanking of the electron beam in the CRT permits the generation of a visible trace at the face plate 10 of the CRT 2 in character configuration corresponding to the composite deflection field produced by the X- and Y-axis deflection signals. Depending upon the particular character generating technique, certain portions of the trace the beam would normally generate with the particular deflection field may be blanked out to achieve certain characters. Also, it is readily realized that the electron beam must be blanked between characters as well as during the positioning of the beam prior to the display of a certain line of information according to a desired format.

With particular reference now to the illustration of FIG. 2, the operation of the circuit of FIG. 1 will be explained in more detail. For purposes of explanation, it can be assumed that the rotatable arm 36 of the potentiometer 38 is at the initial terminal 40 of the potentiometer. This position corresponds in time to a point $T_0$ on the abscissa of the plot in FIG. 2. The corresponding voltage level of waveform 76 is substantially at a reference level, in this case, ground potential. As the arm 36 rotates in a counterclockwise direction corresponding to the movement of the flexible belt 16 through its triangular path also in a counter-clockwise direction, the voltage at the arm 36 begins to increase in a linear manner as the arm approaches the end terminal 42 of the potentiometer 38. As the voltage at the base electrode 52 of the transistor 54 becomes positive, the transistor 54 begins to conduct current thereby creating a signal across the load resistor 62 which is linearly proportional to the voltage at the base electrode 52. This voltage can be considered to be characterized by the waveform 76 illustrated in FIG. 2. As the moving arm continues to rotate in a counterclockwise direction across the resistance of the potentiometer 38, an amplitude corresponding to a point in time $T_1$ is reached. This corresponds to a position of a particular portion of the flexible belt 16 in the exposure zone between rollers 22 and 24. As this point $T_1$ is reached, signal level detector 82 senses this particular voltage level at its input and generates an output signal as described above to initiate the application of the necessary character and format deflection signals to the various X-, Y- and Z-axis channels which constitute the inputs to the CRT 2. The input data applied at terminal 96 of the symbol and control circuit 84 is then generated in a visual display at the face plate 10 of the CRT 2. This light pattern or display is projected in a full-frame manner onto the photoconductive material 18 of the xerographic belt 16. This projection selectively discharges the photoconductive material resulting in a corresponding latent electrostatic pattern on the photoconductive material 18.

It should be noted that the term "full-frame" implies a complete pattern of information. Generally, a full-frame presentation of information is generated substantially simultaneously.

Therefore, the display at the face plate 10 of the CRT 2 is considered to be substantially of a full-frame nature. However, because the generation of the entire formatted display is not accomplished completely simultaneously, there arises a need to compensate this display for the relative motion of the xerographic belt 16 upon which the display is projected to eliminate any undesirable vertical displacement between information displayed and recorded on the belt 16. This compensation is accomplished by providing the clipped sawtooth signal generated across the load resistor 62 in the emitter circuit of the transistor 54 to one input of the Y-axis amplifier 86 to modify the Y-axis deflection signals received by this amplifier 86 from the symbol and control circuit 84. The addition of these two signals by this amplifier 86 provides a motion-compensated signal input to the Y-axis driver 88 to affect the vertical deflection of the electron beam in the CRT 2 in such a manner as to effectively render the xerographic belt 16 substantially motionless during the projection of the CRT display thereon. In considering the general nature of the phosphor used in the CRT 2, it is well to note that preferably the light emitted therefrom upon electronic bombardment spectrally matches the response characteristic of the particular photoconductive material 18 used in the flexible belt 16.

As hereinabove noted, the signal developed across the load resistor 62 in the emitter circuit of transistor 54 is generally of a shape described by a clipped sawtooth waveform as illustrated in FIG. 2. This curtailing of the ramp portion 74 of the sawtooth signal does not affect the motion compensation effected in the Y-axis channel to the CRT 2. This is so because of the very short interval of time required to display on the face plate 10 the entire formatted data to be projected onto the belt 16. This required projection interval is less than the time interval between points $T_1$ and $T_3$ on the abscissa of the plot illustrated in FIG. 2. Therefore, the clipped portion of the waveform 76 occurring between points $T_3$ and $T_4$ has no effect on the display from the CRT.

As the amplitude of the voltage signal across the load resistor 62 increases from an amplitude corresponding to point $T_1$ to an amplitude corresponding to point $T_2$, for example, the level detector 64 will detect this amplitude corresponding to point $T_2$. In response to this detection, an output signal will be generated which will initiate the forms projector 32 thereby projecting the pattern of the desired form onto the photoconductive material 18 of the flexible xerographic belt 16.

As will be realized from the prior description of the operation of the input base circuit of the transistor 54, Zener diode 58 is in a back biased condition from the voltage generated by the rotation of the arm 36 along the potentiometer 38 during the time interval between $T_0$ and $T_3$. At time $T_3$ the voltage at the cathode electrode of this Zener diode 58 is such a magnitude and polarity as to bias the diode in its Zener region, thereby maintaining a constant voltage level at the base electrode 52 during the remaining movement of the arm 36 toward end terminal 42 of the potentiometer 38. This constant voltage level is represented in FIG. 2 by reference numeral 59.

As noted before, it is desirable to provide waveform 76 with a very steep ramp portion 74 for the reason that detectors 64 and 82 can then be designed to detect a specific voltage level without a great degree of accuracy. By providing a steep ramp portion, the detectors may err slightly in the detection of a designated signal amplitude without a proportional error in time. This insures proper registration of the two exposures even in the presence of a slight detecting error on the part of detectors 64 and 82. In addition to this advantage, the two voltage levels at points $T_2$ and $T_3$ may be selected with a minimum time interval between $T_2$ and $T_3$ while still maintaining a voltage differential between the corresponding voltage levels. This also reduces the need for precision detection by the detectors 64 and 82. As the moving arm 36 reaches the end terminal 42 of the potentiometer 38, corresponding approximately to point $T_4$ in FIG. 2 the previous cycle can then be repeated.

By prior optical alignment, the projection of the CRT display and the form projection can be made to be superimposed one upon the other by suitably selecting points $T_1$ and $T_2$ corresponding to amplitudes along the ramp portion 74 of the voltage signal waveform 76 as illustrated in FIG. 2. It is understood that this selection of signal amplitudes is preferably a function of the speed of the xerographic belt 16.

It can be appreciated that the time which elapses between points $T_0$ and $T_1$ on the time axis of FIG. 2 represents that time necessitated by the speed of the xerographic belt 16 to move a portion thereof adjacent from roller 22 to the CRT exposure region. The time between points $T_1$ and $T_2$ represents the requisite time needed to move the latent character pattern on the xerographic belt 16 into position of proper registration with the form pattern projected from the forms projector 32 onto the xerographic belt 16. Typically, the time interval between points $T_2$ and $T_5$ can be considered as that time necessary to permit the composite latent electrostatic pattern of the formatted character display and the forms pattern to move along the triangular path of the belt 16 out of the exposure zone and to permit a new area of the belt 16 to move into the exposure zone of the CRT 2.

Similarly points $T_5$, $T_6$, and $T_7$ in FIG. 2 correspond respectively to points $T_1$, $T_2$, and $T_3$ in a subsequent cycle of operation of the circuit of FIG. 1.

In summary, therefore, the present invention provides a simple, inexpensive, and reliable electromechanical apparatus for insuring proper registration of at least two full-frame exposures, permitting a composite hard copy of the desired data constituting the exposures. This is accomplished through the use of a simple, linear potentiometer having a movable arm which is suitably linked with the movement of a light sensitive recording medium to generate a position signal corresponding to various positions of the recording medium in the exposure zone of the apparatus. By using signal level detectors to initiate successive full-frame exposures, registration of these exposures on a recording medium is obtained as well as a compensation for the motion of this medium.

While the invention has been described with reference to the circuit and apparatus disclosed herein, it is not confined to the details set forth, since electrical and mechanical equivalent components may be substituted for the components of the preferred circuit and apparatus without departing from the scope of the invention. Thus, for example, although a single negative frame in the forms projector 32 is illustrated and described, it is apparent that a roll of film bearing various form patterns may be used with a suitable form selecting arrangement provided therefor.

Also, while only two initiate signals are developed in response to specified levels in the sawtooth waveform 76, it should be realized that a greater number of such signals may be derived by detecting various amplitude levels of this waveform 76 to provide synchronization of other operations pertinent to the described circuit and apparatus.

In addition, although a flexible xerogaphic belt is disclosed following a triangular path, it is equally apparent that any path configuration may be utilized or the belt may be replaced with a simple xerographic flat plate which is moved uniformly in one direction and then reversed rapidly to its initial starting point for recycling.

Further, it should be realized that, although the recording medium 16 has been described as moving continuously, the recording medium or belt 16 may be moved in a step-by-step manner to allow various exposures of the photoconductor 18 while it is motionless. The signal generated by the potentiometer 38 would then have a waveform of linear segments separated by constant amplitude portions.

While the description of the present invention has referred to a photoconductvie belt, it is understood that a photographic recording medium may also be utilized.

In addition, although a cathode ray tube is described in a preferred embodiment of the present invention, any information display apparatus may be suitable for synchronization with the full-frame projector 32 in accordance with the concept of the present invention.

Therefore, it is intended that such modifications or changes to be covered as may come within the scope of the invention as defined by the following claims.

What is claimed is:

1. Recording apparatus comprising:

(a) a recording medium;

(b) drive means for moving successive portions of said recording medium through a recording zone at a predetermined rate;

(c) signal means for generating a linearly varying signal representative of the position of each of said successive portions of said recording medium as said each portion passes through said recording zone; and, (d) a plurality of utilization means each including recording means for recording data on said medium and being responsive to a single selected amplitude of said linearly varying signal indicative of successive positions of each of said portions of said recording medium in said recording zone.

2. Recording apparatus comprising:

(a) a recording medium;

(b) drive means for moving successive portions of said recording medium through a recording zone at a predetermined rate;

(c) signal means for generating a linearly varying signal representative of the position of each of said successive portions of said recording medium as said each portion passes through said recording zone, said signal means including linear potentiometer means having a movable tap and at least two terminals, said tap being mechanically coupled to said drive means to effect movement of said tap from one of said terminals to the other at a rate proportional to said predetermined rate; and, (d) utilization means including recording means for recording data on said medium, said utilization means being responsive to selected amplitudes of said linearly varying signal indicative of successive positions of each of said portions of said recording medium in said recording zone, said utilization means further including plural amplitude detector means for generating output signals in response to plural predetermined signal amplitudes, respectively.

3. Information recording apparatus comprising:

(a) an input terminal adapted to receive information signals;

(b) a light sensitive recording medium;

(c) drive means for effecting uniform movement of said recording medium through a path, a portion of which includes an exposure zone;

(d) position indicator means coupled to said drive means for generating a plurality of successive control signals representative of a plurality of successive positions of a predetermined point of said recording medium as said point passes through said exposure zone;

(e) control means coupled to said input terminal for selectively generating vertical and horizontal output signals representative of said information signals in response to one of said control signals;

(f) circuit means coupled to said control means for generating horizontal and vertical deflection signals in response to said vertical and horizontal output signals;

(g) cathode ray tube means for projecting a formatted informational display in said exposure zone in response to said vertical and horizontal deflection signals; and, (h) full-frame projection means for projecting a predetermined light pattern in said exposure zone in response to another of said control signals.

4. Apparatus as defined in claim 3 wherein:

(a) said position indicator means includes, (1) a substantially linear resistance having two terminals and a potential thereacross and a movable contact arm mechanically coupled to said drive means to effect movement of said arm from one terminal of said resistance to the other proportional to the movement of said recording medium through said exposure zone;

(2) first and second amplitude detector means electrically coupled to said movable arm for generating first and second control signals in response to first and second amplitudes of said linearly varying signal; and, (b) wherein said circuit means includes vertical deflection amplifier means coupled to said movable contact arm for generating a vertical deflection signal compensated for the relative motion between said formatted informational display and said recording medium in said exposure zone.

5. Information recording apparatus comprising:

(a) an input terminal adapted to receive information signals;

(b) recording medium including a photoconductive layer supported by a conductive layer;

(c) drive means for effecting uniform movement of successive portions of said medium through a path including an exposure zone;

(d) position indicator means mechanically coupled to said drive means for generating a linearly varying signal as a function of the movement of each of said successive portions through a plurality of positions in said exposure zone, said indicator means including a substantially linear resistance having two terminals and a potential thereacross and a movable arm in slidable contact relation with said resistance, said arm being mechanically coupled to said drive means to effect a cyclic motion of said arm from one of said two terminals to the other of said terminals proportional to the movement of said successive portions through said exposure zone;

(e) first amplitude detector means electrically coupled to said position indicator means for generating a first control signal in response to a first amplitude of said linearly varying signal;

(f) second amplitude detector means electrically coupled to said position indicator means for generating a second control signal in response to a second amplitude of said linearly varying signal;

(g) control circuit means coupled to said input terminal for selectively generating vertical and horizontal output signals representative of said information signals in response to said first control signal;

(h) horizontal circuit means responsive to said horizontal output signals for generating horizontal deflection signals;

(i) vertical circuit means responsive to said vertical output signals and said linearly varying signal for generating vertical deflection signals compensated for the relative motion between said formatted informational display and said belt in said exposure zone;

(j) cathode ray tube means for projecting a formatted informational display in said exposure zone in response to said vertical and horizontal deflection signals;

(k) full-frame projection means for projecting a predetermined light pattern in said exposure zone in response to said second control signal.

References Cited

UNITED STATES PATENTS

| | | | |
|---|---|---|---|
| 2,736,770 | 2/1956 | McNaney | 178—6.6 X |
| 3,051,044 | 8/1962 | McNaney. | |
| 3,132,206 | 5/1964 | King | 178—6.6 X |

NORTON ANSHER, Primary Examiner

W. A. SIVERTSON, Assistant Examiner

U.S. Cl. X.R.

178—6.6